United States Patent
Arakawa (10) Patent No.: US 7,355,196 B2
(45) Date of Patent: Apr. 8, 2008

(54) RADIATION IMAGE SIGNAL ACQUIRING METHOD

(75) Inventor: Satoshi Arakawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 114 days.

(21) Appl. No.: 11/324,296

(22) Filed: Jan. 4, 2006

(65) Prior Publication Data

US 2006/0151728 A1 Jul. 13, 2006

(30) Foreign Application Priority Data

Jan. 7, 2005 (JP) .............................. 2005-002314

(51) Int. Cl.
*G01T 1/105* (2006.01)

(52) U.S. Cl. ...................... 250/584; 250/581; 250/582

(58) Field of Classification Search ......... 250/580–586
See application file for complete search history.

(56) References Cited

U.S. PATENT DOCUMENTS

| | | | |
|---|---|---|---|
| 5,051,587 A | * | 9/1991 | Hara et al. ................... 250/584 |
| 5,481,623 A | * | 1/1996 | Hara ........................... 382/128 |
| 2002/0041977 A1 | * | 4/2002 | Iwabuchi et al. ........... 428/690 |
| 2004/0001953 A1 | * | 1/2004 | Struye et al. ............... 428/408 |

FOREIGN PATENT DOCUMENTS

| | | |
|---|---|---|
| JP | 62-18536 A | 1/1987 |
| JP | 10-232452 A | 9/1998 |

* cited by examiner

*Primary Examiner*—David Porta
*Assistant Examiner*—Casey Bryant
(74) *Attorney, Agent, or Firm*—Sughrue Mion, PLLC

(57) ABSTRACT

A stimulable phosphor sheet, on which a radiation image of an object has been stored, is scanned with stimulating rays, which cause the stimulable phosphor sheet to emit light in proportion to the amount of energy stored on the stimulable phosphor sheet during exposure of the stimulable phosphor sheet to radiation. The light, which is emitted by the stimulable phosphor sheet when the stimulable phosphor sheet is scanned with the stimulating rays, is detected, and an image signal representing the radiation image of the object is acquired. The scanning of the stimulable phosphor sheet with the stimulating rays is performed from an object image-carrying edge area, in which a radiation image pattern representing the object has been stored, the object image-carrying edge area being one of edge areas of the stimulable phosphor sheet.

19 Claims, 6 Drawing Sheets

RADIATION IMAGE SIGNAL ACQUIRING METHOD

BACKGROUND OF THE INVENTION

1. Field of the Invention

This invention relates to a radiation image signal acquiring method. This invention particularly relates to a radiation image signal acquiring method, wherein light emitted by a stimulable phosphor sheet, on which a radiation image of an object has been stored, during scanning with stimulating rays is detected, and wherein an image signal representing the radiation image of the object is thereby acquired.

2. Description of the Related Art

Radiation image recording and read-out systems utilizing stimulable phosphors have heretofore been known. With the radiation image recording and read-out systems utilizing the stimulable phosphors, radiation carrying image information of an object is irradiated to a sheet containing a stimulable phosphor (hereinbelow referred to as the stimulable phosphor sheet), and a radiation image of the object is thus stored on the stimulable phosphor sheet. The stimulable phosphor sheet, on which the radiation image has been stored, is then exposed to stimulating rays, such as a laser beam, which cause the stimulable phosphor sheet to emit light in proportion to the amount of energy stored on the stimulable phosphor sheet during the exposure of the stimulable phosphor sheet to the radiation. The light emitted by the stimulable phosphor sheet is photoelectrically detected, and an image signal representing the radiation image of the object is thereby acquired.

For example, in the cases of mammography, in which a radiation image of a breast is recorded and read out, the scanning of a stimulable phosphor sheet, on which the radiation image of the breast has been stored, with the stimulating rays has heretofore been performed in a direction, along which an object image-carrying edge area carrying a radiation image pattern representing a chest wall side of the breast extends, the object image-carrying edge area being one of edge areas of the stimulable phosphor sheet. The scanning of the stimulable phosphor sheet with the stimulating rays has thus been performed heretofore in the aforesaid direction since a relationship between the position of a cassette, in which the stimulable phosphor sheet has been accommodated, and the position of the breast at the time of the recording of the mammogram and a relationship between the position of the cassette and the position of a radiation image read-out apparatus at the time of the loading of the cassette into the radiation image read-out apparatus for the readout of the radiation image from the stimulable phosphor sheet have been set, such that the aforesaid relationships may always coincide with predetermined positional relationships.

As described above, when the stimulable phosphor, which is contained in the stimulable phosphor sheet carrying the radiation image stored thereon, is exposed to the stimulating rays, the stimulable phosphor releases radiation energy, which has been stored in the stimulable phosphor, as the emitted light. The intensity of the light emitted by the stimulable phosphor reaches an approximately maximum light emission intensity quickly (e.g., within several nanoseconds) after the stimulating rays have been irradiated to the stimulable phosphor. However, after the irradiation of the stimulating rays to the stimulable phosphor has been finished, the light emission by the stimulable phosphor continues as after-glow. The light emission intensity of the after-glow becomes low with the passage of time.

Therefore, in cases where the light, which is emitted by the stimulable phosphor sheet during the scanning of the stimulable phosphor sheet with the stimulating rays, is detected, the light containing both the light emitted from an area of the stimulable phosphor sheet, which area is being exposed to the stimulating rays, and the after-glow emitted from an area of the stimulable phosphor sheet, at which area the irradiation of the stimulating rays has already been finished, is detected. In cases where an image signal is acquired with the detection of the emitted light containing the after-glow and utilized for reproduction of a visible image representing the radiation image stored on the stimulable phosphor sheet, sharpness of the reproduced visible image becomes low as the intensity of the after-glow mixed in the emitted light becomes high, i.e., as the after-glow components contained in the emitted light to be detected increase.

As a technique for suppressing the adverse effects of the after-glow described above, there has been known a technique, wherein a relationship between a peak optical intensity of the light, which is emitted by the stimulable phosphor sheet when the stimulable phosphor sheet is exposed to the stimulating rays, and the light emission intensity of the following after-glow is approximately represented by a function, or information representing the relationship described above is stored previously as a data table, wherein the components representing the after-glow are removed from the image signal representing the optical intensity of the emitted light having been detected, and wherein an image signal representing the radiation image is thereby acquired. (The afore said technique for suppressing the adverse effects of the after-glow, wherein the components representing the after-glow are removed from the image signal representing the optical intensity of the emitted light having been detected, is described in, for example, Japanese Unexamined Patent Publication No. 10(1998)-232452.)

Also, in cases where a stimulable phosphor sheet has been subjected to a radiation image recording operation, and a radiation image of an object has been recorded on the stimulable phosphor sheet, an indirect radiation-exposed region and a direct radiation-exposed region are formed on the stimulable phosphor sheet. The indirect radiation-exposed region is the region having been exposed to radiation having been produced by a radiation source, which radiation carries image information of the object, such as a human body, (e.g., by passing through the object) and has attenuated energy. The direct radiation-exposed region is the region having been exposed to radiation having been produced by the radiation source, which radiation does not carry image information of the object (e.g., which has passed through areas other than the object) and has energy having not been attenuated. A different technique for suppressing the adverse effects of the after-glow described above has been proposed, wherein the indirect radiation-exposed region on the stimulable phosphor sheet is recognized, and wherein image readout is performed on only the indirect radiation-exposed region having been recognized. (The proposed different technique, wherein the image readout is performed on only the indirect radiation-exposed region, is described in, for example, Japanese Unexamined Patent Publication No. 62(1987)-018536.) Specifically, the stimulable phosphor located within the direct radiation-exposed region stores a high level of radiation energy, and the stimulable phosphor located within the indirect radiation-exposed region stores a level of radiation energy lower than the level of radiation energy stored in the direct radiation-exposed region. The proposed different technique described above, wherein the image readout is performed on only the indirect radiation-exposed region, aims at preventing the problems from occurring in that the after-glow having a high light emission intensity, which after-glow emanates from the direct radiation-exposed region after the direct radiation-exposed region has been exposed to the stimulating rays for the image readout, mixes into the light, which is emitted from the indirect radiation-exposed region and carries the image information of the object. More specifically, with the proposed different technique described above, wherein the image readout is performed on only the indirect radiation-exposed region, the stimulating rays having a low intensity is previously irradiated to the stimulable phosphor sheet, on which the radiation image of the object has been stored, and the light emitted by the stimulable phosphor sheet is detected. In this manner, a difference between the direct radiation-exposed region, which emits the light having a high light emission intensity, and the indirect radiation-exposed region, which emits the light having a light emission intensity lower than the light emission intensity of the light emitted from the direct radiation-exposed region, is recognized. Thereafter, the image readout is performed on only the indirect radiation-exposed region.

However, with the aforesaid technique for suppressing the adverse effects of the after-glow, wherein the components representing the after-glow are removed from the image signal representing the optical intensity of the emitted light having been detected, the problems occur in that complicated operation processing is required for the removal of the after-glow components from the image signal, and therefore the efficiency with which the image signal representing the radiation image is acquired is not capable of being kept high.

Also, with the aforesaid technique for suppressing the adverse effects of the after-glow, wherein the image readout is performed on only the indirect radiation-exposed region, the problems occur in that complicated processing is required for the recognition of the indirect radiation-exposed region, in that complicated control is required for the irradiation of the stimulating rays only to the indirect radiation-exposed region, and in that the apparatus cost is not capable of being kept low.

Therefore, there is a strong demand for a technique capable of easily suppressing the adverse effects of the after-glow.

SUMMARY OF THE INVENTION

The primary object of the present invention is to provide a radiation image signal acquiring method, wherein a stimulable phosphor sheet, on which a radiation image of an object has been stored, is scanned with stimulating rays, such that lowering of quality of an image signal representing the radiation image of the object, which image signal is obtained from the scanning, is capable of being suppressed easily.

The present invention provides a first radiation image signal acquiring method, comprising the steps of:

i) scanning a stimulable phosphor sheet, on which a radiation image of an object has been stored, with stimulating rays, which cause the stimulable phosphor sheet to emit light in proportion to the amount of energy stored on the stimulable phosphor sheet during exposure of the stimulable phosphor sheet to radiation, and ii) detecting the light, which is emitted by the stimulable phosphor sheet when the stimulable phosphor sheet is scanned with the stimulating rays, whereby an image signal representing the radiation image of the object is acquired, wherein the scanning of the stimulable phosphor sheet with the stimulating rays is performed from an object image-carrying edge area, in which a radiation image pattern representing the object has been stored, the object image-carrying edge area being one of edge areas of the stimulable phosphor sheet.

The present invention also provides a second radiation image signal acquiring method, comprising the steps of:

i) scanning a stimulable phosphor sheet, on which a radiation image of a breast has been stored, with stimulating rays, which cause the stimulable phosphor sheet to emit light in proportion to the amount of energy stored on the stimulable phosphor sheet during exposure of the stimulable phosphor sheet to radiation, and ii) detecting the light, which is emitted by the stimulable phosphor sheet when the stimulable phosphor sheet is scanned with the stimulating rays, whereby an image signal representing the radiation image of the breast is acquired, wherein the scanning of the stimulable phosphor sheet with the stimulating rays is performed from an object image-carrying edge area, in which a radiation image pattern representing a chest wall side of the breast has been stored, the object image-carrying edge area being one of edge areas of the stimulable phosphor sheet.

Each of the first and second radiation image signal acquiring methods in accordance with the present invention may be modified such that the scanning of the stimulable phosphor sheet with the stimulating rays is performed with an operation for irradiating the stimulating rays to each of point-shaped sites on the stimulable phosphor sheet.

Also, each of the first and second radiation image signal acquiring methods in accordance with the present invention may be modified such that the stimulable phosphor sheet is provided with a stimulable phosphor layer containing a compound, which may be represented by a chemical formula MeX:Eu, wherein Me represents at least one kind of element selected from the group consisting of Rb (rubidium) and Cs (cesium), and X represents at least one kind of element selected from the group consisting of Cl (chlorine), Br (bromine), and I (iodine).

Further, each of the first and second radiation image signal acquiring methods in accordance with the present invention may be modified such that the stimulable phosphor layer is a layer having been formed with a vapor phase deposition technique and comprises optically anisotropic pillar-shaped crystal structures, which extend in a direction normal to a surface of the stimulable phosphor layer.

The term "object" as used herein means the object, the image of which is to be recorded. Specifically, for example, resin members for supporting the object at the time of the recording of the radiation image of the object, and the like, are not embraced in the meaning of the object.

Also, the term "object image-carrying edge area" as used herein means the edge area contained in the region of the stimulable phosphor sheet, in which region the radiation image representing the object has been stored.

Further, the term "performing scanning of a stimulable phosphor sheet with stimulating rays from an object image-carrying edge area" as used herein embraces both the cases, wherein the scanning with the stimulating rays is started with the object image-carrying edge area, and the cases, wherein the scanning with the stimulating rays is started with a region, which is located on the side outward from the stimulable phosphor sheet and outward from the object image-carrying edge area, and wherein the scanning with the stimulating rays is then continued through the object image-carrying edge area and into the region within the stimulable phosphor sheet.

With the first radiation image signal acquiring method in accordance with the present invention, the scanning of the stimulable phosphor sheet with the stimulating rays is performed from the object image-carrying edge area, in which the radiation image pattern representing the object has been stored, the object image-carrying edge area being one of the edge areas of the stimulable phosphor sheet. Also, with the second radiation image signal acquiring method in accordance with the present invention, the scanning of the stimulable phosphor sheet with the stimulating rays is performed from the object image-carrying edge area, in which the radiation image pattern representing the chest wall side of the breast has been stored, the object image-carrying edge area being one of the edge areas of the stimulable phosphor sheet. Therefore, with each of the first and second radiation image signal acquiring methods in accordance with the present invention, the scanning with the stimulating rays is capable of being started with the indirect radiation-exposed region on the stimulable phosphor sheet. Accordingly, it becomes possible to suppress the lowering of the quality of the image signal, which lowering occurs due to the after-glow of the light emitted by the stimulable phosphor sheet at the time of the scanning with the stimulating rays. Specifically, if the scanning with the stimulating rays is performed from the direct radiation-exposed region toward the indirect radiation-exposed region on the stimulable phosphor sheet, the after-glow having a high light emission intensity, which after-glow accompanies the emission of the light from the direct radiation-exposed region having been exposed to the radiation that does not carry the image information of the object (e.g., the radiation that has passed through areas other than the object), will mix into the light, which is emitted from the indirect radiation-exposed region having been exposed to the radiation that carries the image information of the object (e.g., the radiation that has passed through the object), and which has a light emission intensity lower than the light emission intensity of the light emitted from the direct radiation-exposed region. In such cases, the after-glow having mixed into the light emitted from the indirect radiation-exposed region will be detected together with the light emitted from the indirect radiation-exposed region. However, in cases where the scanning with the stimulating rays is performed from the indirect radiation-exposed region toward the direct radiation-exposed region on the stimulable phosphor sheet, the problems do not occur in that the after-glow having a high light emission intensity, which after-glow accompanies the emission of the light from the direct radiation-exposed region, mixes into the light, which is emitted from the indirect radiation-exposed region. Therefore, with each of the first and second radiation image signal acquiring methods in accordance with the present invention, wherein the scanning with the stimulating rays is performed in the manner described above, the problems are capable of being prevented from occurring in that the after-glow components having a high light emission intensity, which after-glow components accompany the emission of the light from the direct radiation-exposed region, are detected together with the light, which is emitted from the indirect radiation-exposed region and represents the radiation image of the object. Accordingly, the after-glow components (i.e., the noise components) contained in the image signal representing the radiation image of the object are capable of being suppressed. As a result, the lowering of the quality of the image signal representing the radiation image of the object having been stored on the stimulable phosphor sheet, which image signal is obtained from the scanning of the stimulable phosphor sheet with the stimulating rays, is capable of being suppressed easily.

DESCRIPTION OF THE PREFERRED EMBODIMENTS

The present invention will hereinbelow be described in further detail with reference to the accompanying drawings.

Figure 1:
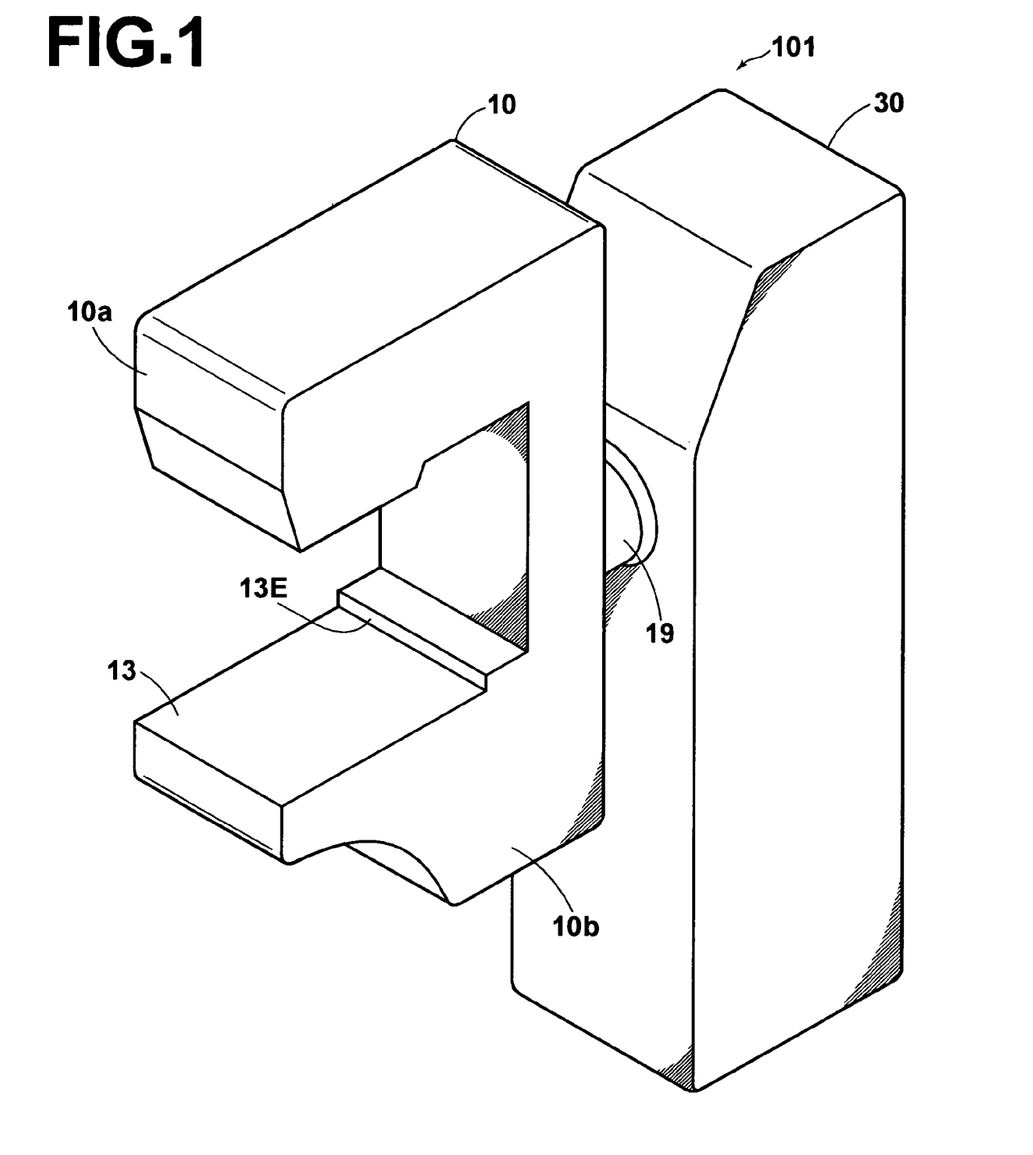
FIG. 1 is a perspective view showing a radiation image recording apparatus, which constitutes a radiation image recording and read-out system for carrying out the radiation image signal acquiring method in accordance with the present invention.
Figure 2:
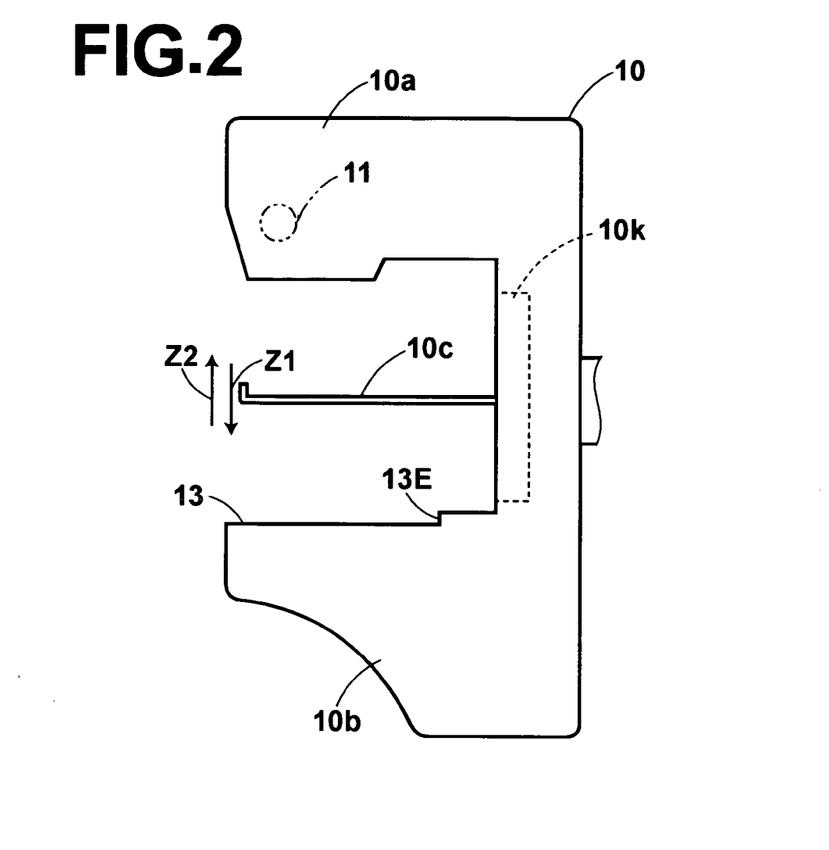
FIG. 2 is a side view showing an arm of the radiation image recording apparatus of FIG. 1.
Figure 3:
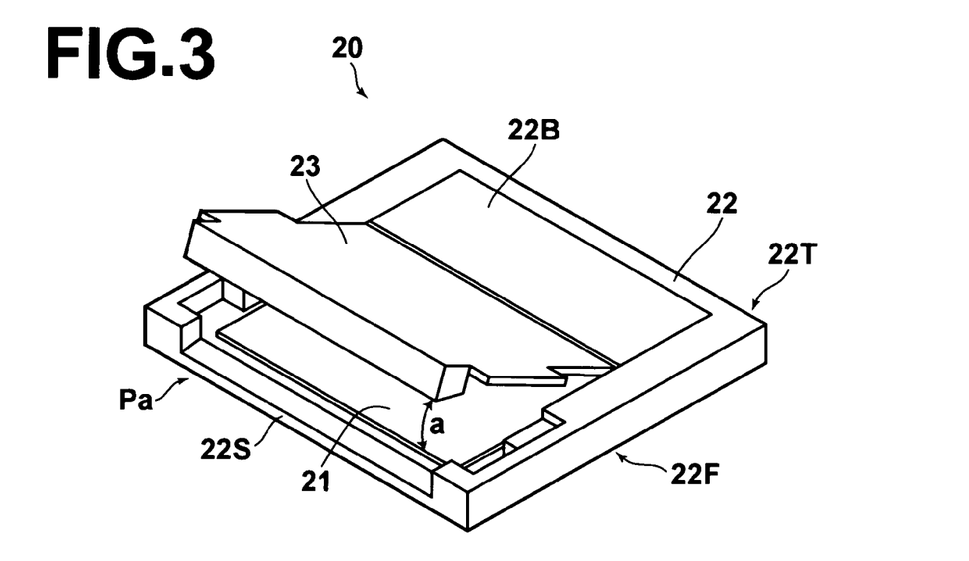
FIG. 3 is a perspective view showing a cassette, in which a stimulable phosphor sheet has been accommodated.
Figure 4:
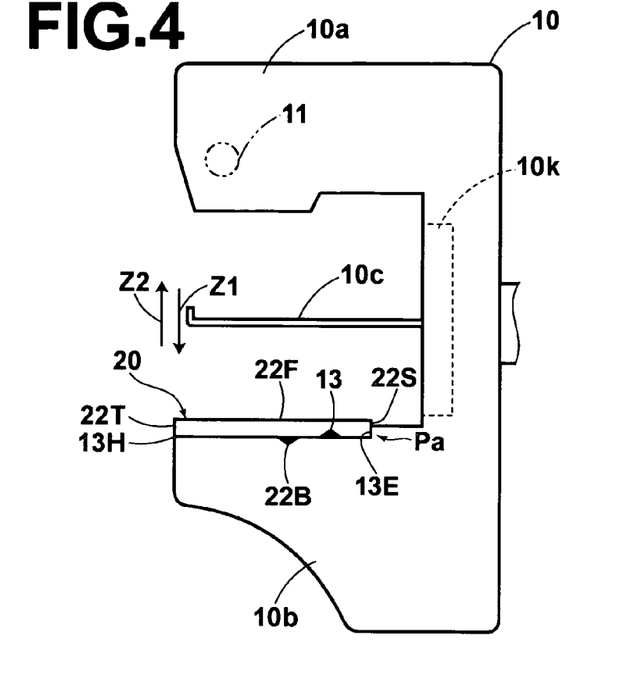
FIG. 4 is a side view showing how the cassette is located at a predetermined position for a radiation image recording operation.
Figure 5:
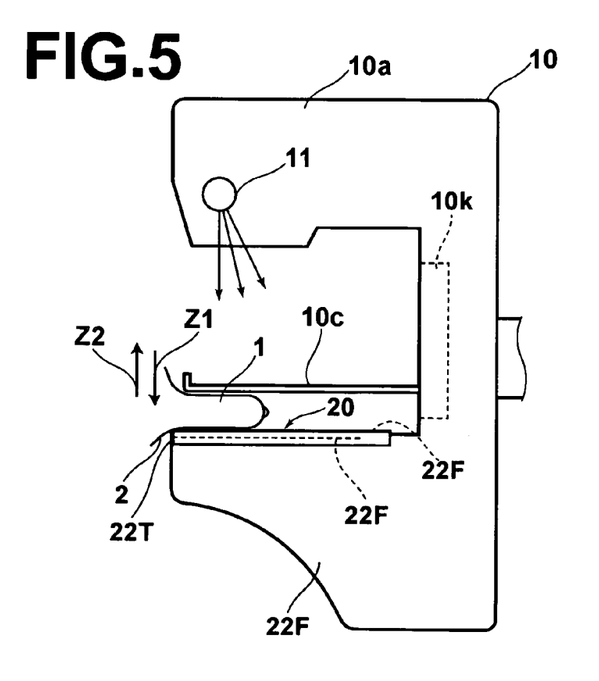
FIG. 5 is a side view showing how a radiation image of a breast is recorded on the stimulable phosphor sheet having been accommodated in the cassette.
Figure 6:
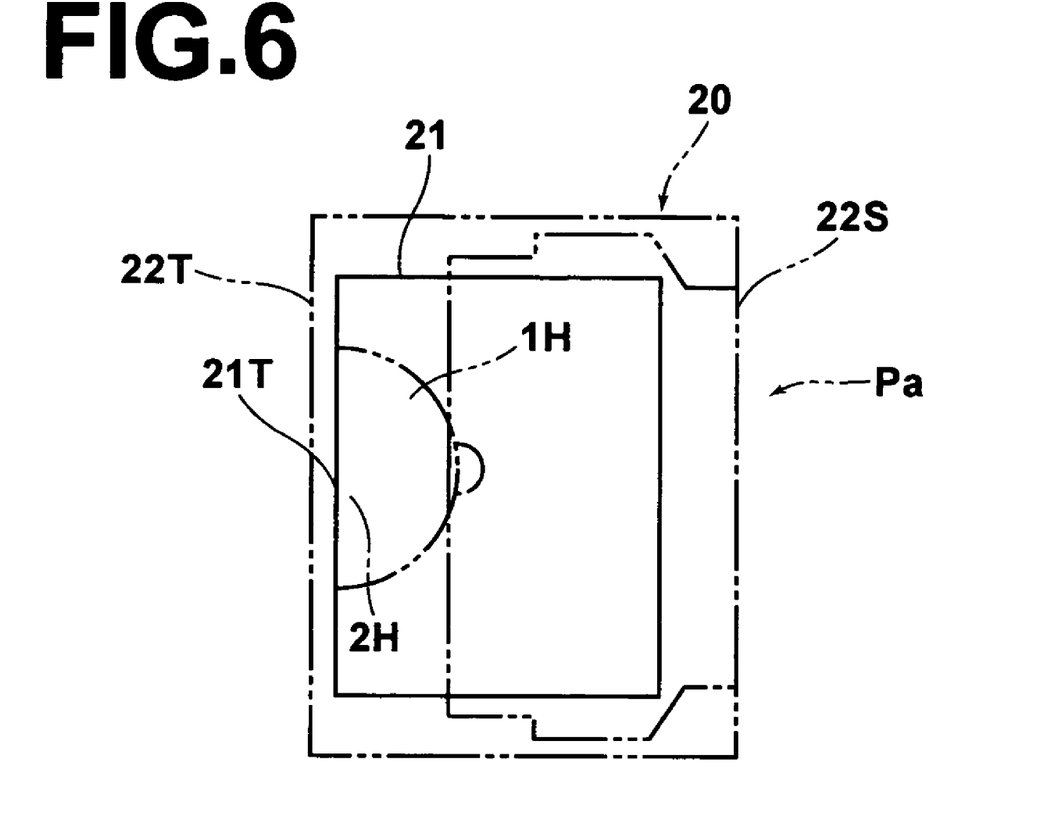
FIG. 6 is an explanatory view showing a position of the radiation image of the breast, which radiation image has been recorded on the stimulable phosphor sheet, together with the cassette, in which the stimulable phosphor sheet has been accommodated.

FIG. 1 is a perspective view showing a radiation image recording apparatus, which constitutes a radiation image recording and read-out system for carrying out the radiation image signal acquiring method in accordance with the present invention. FIG. 2 is a side view showing an arm of the radiation image recording apparatus of FIG. 1. FIG. 3 is a perspective view showing a cassette, in which a stimulable phosphor sheet has been accommodated. FIG. 4 is a side view showing how the cassette is located at a predetermined position for a radiation image recording operation. FIG. 5 is a side view showing how a radiation image of a breast is recorded on the stimulable phosphor sheet having been accommodated in the cassette. FIG. 6 is an explanatory view showing a position of the radiation image of the breast, which radiation image has been recorded on the stimulable phosphor sheet, together with the cassette, in which the stimulable phosphor sheet has been accommodated.

With reference to FIG. 1, a radiation image recording apparatus 101 performs a radiation image recording operation for irradiating the radiation to an object and recording a radiation image of the object on a stimulable phosphor sheet. The radiation image recording apparatus 101 comprises an arm 10 for supporting a cassette 20, in which a stimulable phosphor sheet 21 has been accommodated. The radiation image recording apparatus 101 also comprises a base 30, which is provided with a support shaft 19 for supporting the arm 10.

The arm 10 has a U-shaped form. A head section 10a is located at an end of the U-shaped form of the arm 10. A base section 10b is located at the other end of the U-shaped form of the arm 10. As illustrated in FIG. 2, a radiation source 11 is located within the head section 10a. The radiation source 11 produces the radiation and irradiates the radiation toward the base section 10b. Also, the base section 10b is provided with a cassette support surface 13 for supporting the cassette 20, onto which the radiation having been produced by the radiation source 11 and having passed through the object is irradiated.

Further, as illustrated in FIG. 2, the arm 10 is provided with a compression plate 10c, which is located between the head section 10a and the base section 10b. The compression plate 10c is constituted of a member, such as an acrylic plate, which is capable of sufficiently transmitting the radiation such that the radiation image recording operation may be performed appropriately. The compression plate 10c is capable of being moved by a movement mechanism 10k in the direction indicated by the arrow Z1 in FIG. 2 and in the direction indicated by the arrow Z2 in FIG. 2.

With the radiation image recording apparatus 101, a breast of a person to be examined, which breast acts as an object, is sandwiched between the compression plate 10c and the cassette 20 having been supported on the cassette support surface 13, and the radiation image recording operation is performed in this state. In FIG. 1, the compression plate 10c is not shown for clearness.

As illustrated in FIG. 3, the cassette 20 comprises a box member 22 for accommodating the stimulable phosphor sheet 21. The cassette 20 also comprises a cover member 23, which is capable of being opened and closed in the directions indicated by the double headed arrow a in FIG. 3. The box member 22 has an opening Pa, through which the stimulable phosphor sheet 21 is to be inserted into the cassette 20 and taken out from the cassette 20. The opening Pa extends from a side face 22S at an end to part of a rear surface 22B, which adjoins the side face 22S. The opening Pa is closed by the cover member 23.

The cassette 20 is supported on the cassette support surface 13, such that a front surface 22F, which is opposite to the rear surface 22B provided with the cover member 23, is located on the radiation irradiation side. Therefore, the member constituting the front surface 22F of the box member 22 is made from one of known materials, such as resins, which have good radiation transmitting characteristics and are capable of sufficiently transmitting the radiation such that the radiation image recording operation may be performed appropriately. The box member 22 and the cover member 23 may be constituted with an integral molding technique by use of a resin material. Alternatively, the box member 22 and the cover member 23 may be constituted of different members and connected with each other.

How the radiation image recording apparatus 101 operates will be described hereinbelow.

As illustrated in FIG. 4, in cases where the radiation image recording operation is to be performed with the radiation image recording apparatus 101, the cassette 20 is located on the cassette support surface 13, such that the front surface 22F of the cassette 20 stands facing up, i.e. such that the rear surface 22B of the cassette 20 stands facing the cassette support surface 13. At this time, the cassette 20 is supported on the cassette support surface 13, such that a side face 22T, which is opposite to the side face 22S of the cassette 20 (i.e., the side face on the side of the opening Pa), is located on an edge 13H at an end of the cassette support surface 13, i.e., on the edge of the cassette support surface 13, which edge is located on the open side of the arm 10 having the U-shaped form. Also, at the time at which the cassette 20 is supported on the cassette support surface 13, the side face 22S of the cassette 20 is brought into abutment with a step-like face 13E of the cassette support surface 13, which step-like face extends in the direction normal to the cassette support surface 13.

Specifically, at the time of the radiation image recording operation, a chest wall of the person to be examined is located above the edge 13H of the cassette support surface 13. Therefore, the cassette 20 is supported on the cassette support surface 13 in an orientation such that the side face 22T of the cassette 20 stands facing the side of the chest wall of the person to be examined.

The cassette 20 is capable of being set on the cassette support surface 13 only in the orientation described above. Specifically, the distance from the side face 22T of the cassette 20 to the stimulable phosphor sheet 21, which has been accommodated in the cassette 20, is capable of being set to be shorter than the distance from a different side face (e.g., the side face 22S) of the cassette 20 to the stimulable phosphor sheet 21, which has been accommodated in the cassette 20. Therefore, the radiation image recording operation is capable of being performed in the state, in which the stimulable phosphor sheet 21 is close to the chest wall of the person to be examined.

Thereafter, as illustrated in FIG. 5, a breast 1 of the person to be examined is located on the cassette 20, which has been set on the cassette support surface 13, and a chest wall 2 of the person to be examined is brought into contact with the side face 22T of the cassette 20. In this state, the compression plate 10c is moved down (in the direction indicated by the arrow Z1 in FIG. 5), and the breast 1 is sandwiched between the cassette 20 and the compression plate 10c.

Thereafter, the radiation is produced by the radiation source 11. The radiation, which has been produced by the radiation source 11, passes through the compression plate 10c, impinges upon the breast 1, and then passes through the front surface 22F of the cassette 20. The radiation is thus irradiated to the stimulable phosphor sheet 21, which has been accommodated in the cassette 20. Also, when the stimulable phosphor sheet 21 is exposed to the radiation, a radiation image 1H (illustrated in FIG. 6) representing the breast 1 is stored on the stimulable phosphor sheet 21.

As illustrated in FIG. 6, the position of the radiation image 1H of the breast 1 having been stored on the stimulable phosphor sheet 21 coincides with the side of the stimulable phosphor sheet 21 having been accommodated in the cassette 20, which side is close to the side face 22T of the cassette 20 (i.e., the side face opposite to the opening Pa). Specifically, a radiation image pattern 2H representing the chest wall 2 is recorded at an edge area 21T of the stimulable phosphor sheet 21.

In the manner described above, the radiation image recording operation on the breast 1 is performed with the radiation image recording apparatus 101. Thereafter, the cassette 20, in which the stimulable phosphor sheet 21 carrying the radiation image 1H of the breast 1 stored thereon has been accommodated, is taken out from the cassette support surface 13 of the radiation image recording apparatus 101. The cassette 20 is loaded into a radiation image signal acquiring apparatus 102 for performing a radiation image read-out operation.

How the radiation image having been stored on the stimulable phosphor sheet is read out with the radiation image signal acquiring apparatus 102 will be described hereinbelow.

Figure 7A:
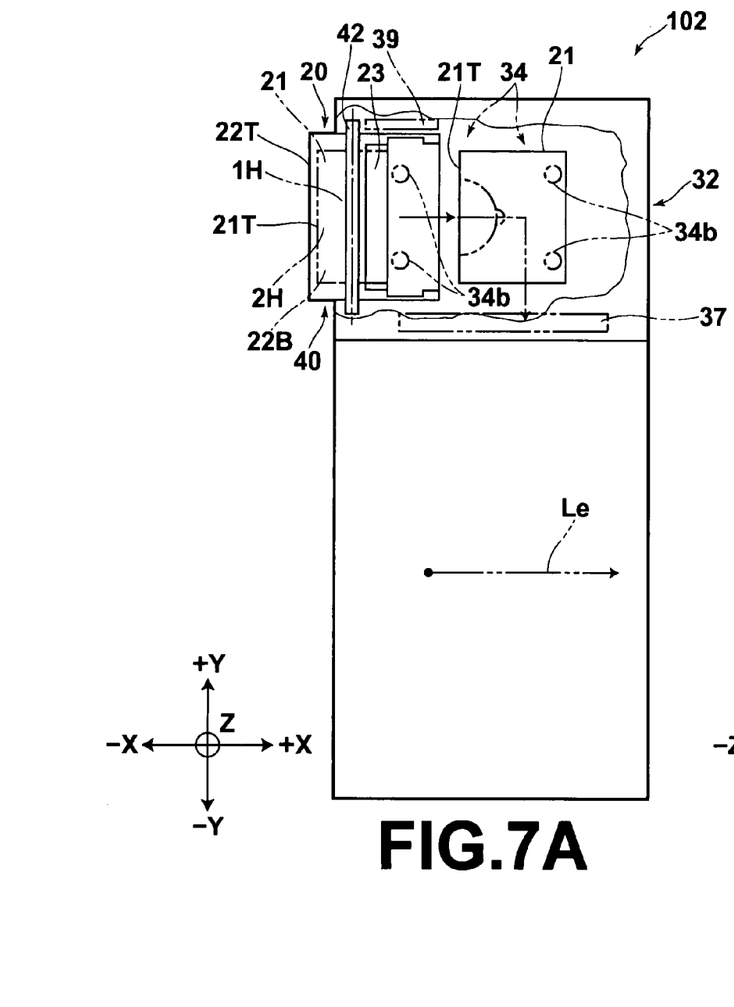
FIG. 7A is a partially sectional front view showing a radiation image signal acquiring apparatus, which constitutes the radiation image recording and read-out system for carrying out the radiation image signal acquiring method in accordance with the present invention.
Figure 7B:
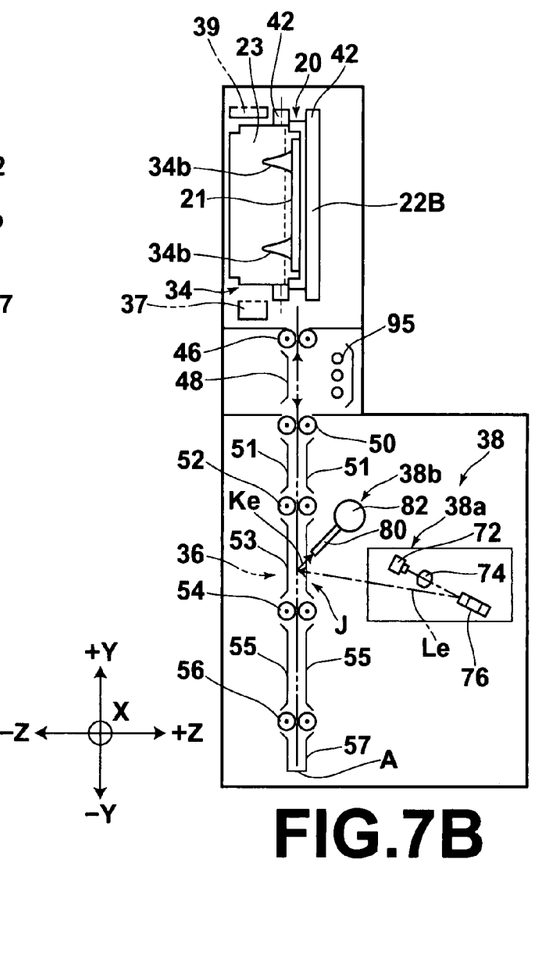
FIG. 7B is a sectional view taken from the direction indicated by the arrow –X in FIG. 7A.
Figure 8:
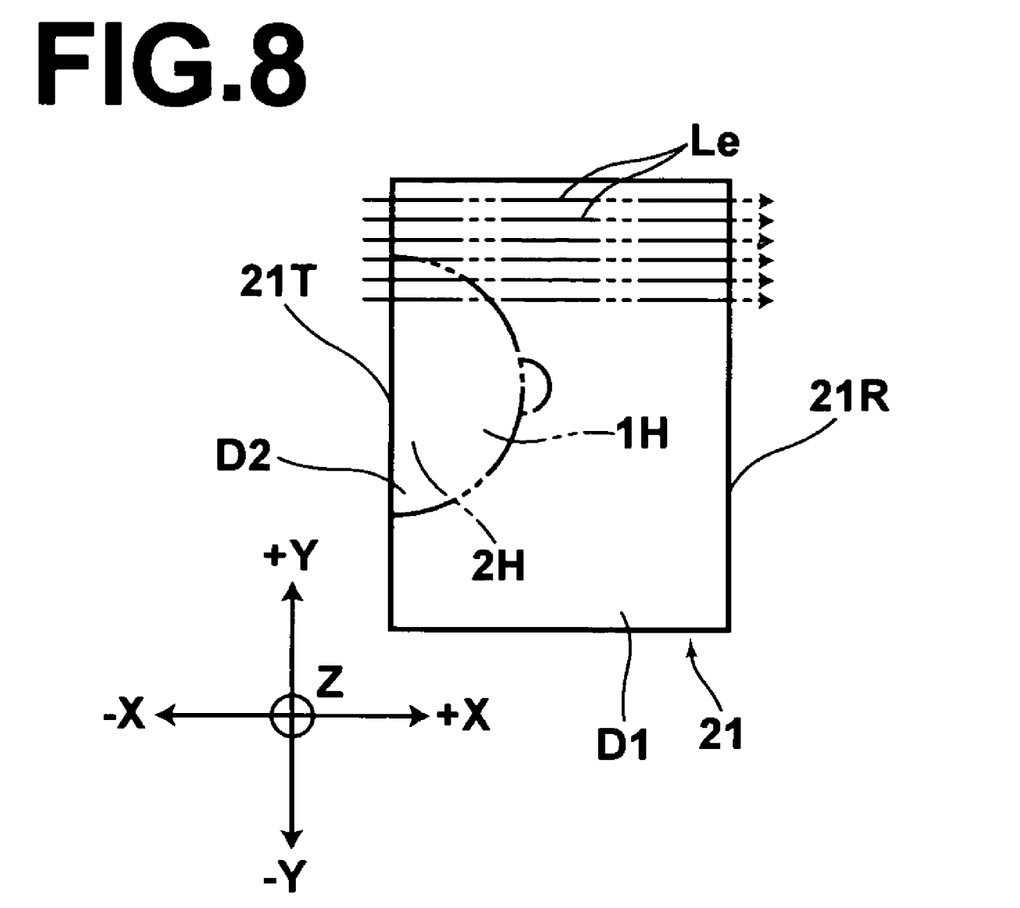
FIG. 8 is an explanatory view showing a direction, in which the stimulable phosphor sheet is scanned with stimulating rays.

FIG. 7A is a partially sectional front view showing a radiation image signal acquiring apparatus, which constitutes the radiation image recording and read-out system for carrying out the radiation image signal acquiring method in accordance with the present invention. FIG. 7B is a sectional view taken from the direction indicated by the arrow −X in FIG. 7A. FIG. 8 is an explanatory view showing a direction, in which the stimulable phosphor sheet is scanned with stimulating rays. FIG. 7A illustrates a partially sectional view for showing the cassette 20, which has been loaded into the radiation image signal acquiring apparatus 102, and the stimulable phosphor sheet 21.

The radiation image signal acquiring apparatus 102 comprises a cassette loading section 32 for receiving the cassette 20, in which the stimulable phosphor sheet 21 carrying the radiation image of the breast 1 stored thereon has been accommodated. The radiation image signal acquiring apparatus 102 also comprises sheet takeout means 34 for supporting the stimulable phosphor sheet 21 having been accommodated in the cassette 20, which has been loaded into the cassette loading section 32, and taking the stimulable phosphor sheet 21 out of the cassette 20. The radiation image signal acquiring apparatus 102 further comprises conveyance means 36 for conveying the stimulable phosphor sheet 21, which has been taken by the sheet takeout means 34 out of the cassette 20, into a radiation image read-out section 38, which will be described below. The radiation image signal acquiring apparatus 102 still further comprises the radiation image read-out section 38 for reading out the radiation image from the stimulable phosphor sheet 21. In FIGS. 7A and 7B, the arrow indicated by the double-dot chained line represents the conveyance path for the stimulable phosphor sheet 21.

The cassette 20 is loaded into the cassette loading section 32 in an orientation such that the stimulable phosphor sheet 21 is taken out of the cassette 20 and inserted into the cassette 20 through the opening Pa of the cassette 20 in horizontal directions (indicated by the arrow +X and the arrow −X in FIG. 7A). Also, the cassette loading section 32 is provided with a cassette support roller 42 for supporting the cassette 20 having been loaded into the cassette loading section 32. The cassette loading section 32 is also provided with cover member opening and closing means 39 for opening and closing the cover member 23 of the cassette 20.

The sheet takeout means 34 is provided with suction cups 34b, 34b for entering into the cassette 20, whose cover member 23 has been opened, and holding the stimulable phosphor sheet 21 by suction. The sheet takeout means 34 is also provided with a suction cup moving mechanism 37 for moving the suction cups 34b, 34b in a predetermined direction, thereby taking the stimulable phosphor sheet 21 out of the cassette 20, and delivering the stimulable phosphor sheet 21 to a roller pair 46, which will be described later. The suction cups 34b, 34b are connected to a pump for air suction through a piping path. The piping path is provided with a leak valve for releasing the suction of the stimulable phosphor sheet 21 by the suction cups 34b, 34b. In FIGS. 7A and 7B, the piping path, the pump, and the leak valve are not shown for clearness.

The suction cup moving mechanism 37 moves the suction cups 34b, 34b in the predetermined direction and thereby delivers the stimulable phosphor sheet 21, which has been taken out of the cassette 20 and has been sucked to the suction cups 34b, 34b, to the roller pair 46 described above. Specifically, the stimulable phosphor sheet 21 is taken out from the cassette 20 in the horizontal direction, i.e. in the direction indicated by the arrow +X in FIG. 7A, and is then conveyed downwardly in the vertical direction, i.e. in the direction indicated by the arrow −Y in each of FIGS. 7A and 7B. The stimulable phosphor sheet 21 is thus delivered to the roller pair 46 described above.

The conveyance means 36 is provided with a conveyance path for conveying the stimulable phosphor sheet 21, which has been taken out from the cassette loading section 32 and has then been conveyed downwardly via a conveyance guide 48 by the actuation of the roller pair 46, to the lowest end A illustrated in FIG. 7B. The conveyance means 36 reciprocally conveys the stimulable phosphor sheet 21 through the conveyance path between the cassette loading section 32 and the lowest end A. The conveyance path is provided with a roller pair 50, a roller pair 52, a roller pair 54, a roller pair 56, a conveyance guide 51, a conveyance guide 53, a conveyance guide 55, and a conveyance guide 57.

As illustrated in FIG. 7B, the radiation image read-out section 38 comprises irradiation means 38a for irradiating stimulating rays Le to the stimulable phosphor sheet 21. The radiation image read-out section 38 also comprises read-out means 38b for detecting the light, which is emitted by the stimulable phosphor sheet 21 when the stimulable phosphor sheet 21 is exposed to the stimulating rays Le.

The irradiation means 38a is provided with a stimulating ray source 72, a lens 74, and a rotating polygon mirror 76, which will be described later. The irradiation means 38a irradiates the stimulating rays Le onto each of point-shaped sites on the stimulable phosphor sheet 21 and thereby scans the stimulable phosphor sheet 21 with the stimulating rays Le in the horizontal direction. More specifically, the irradiation means 38a scans the point-shaped sites on the stimulable phosphor sheet 21 with the stimulating rays Le in the direction indicated by the arrow +X in FIG. 7A.

The read-out means 38b is provided with a light guide member 80 and a photodetector 82, which will be described later.

Also, an erasing light source 95 is located between the cassette loading section 32 and the conveyance means 36. The erasing light source 95 is located at the position that stands facing the conveyance guide 48. The erasing light source 95 produces erasing light for erasing radiation energy, which remains on the stimulable phosphor sheet 21 after the radiation image has been read out from the stimulable phosphor sheet 21.

How the radiation image signal acquiring apparatus 102 operates will be described hereinbelow.

Specifically, firstly, the cassette 20 is loaded through a loading opening 40 into the cassette loading section 32. The cassette 20 is then conveyed by the cassette support roller 42 to the predetermined position and supported at the predetermined position. Also, the cover member 23 of the cassette 20 is opened by the cover member opening and closing means 39. Thereafter, the suction cups 34b, 34b are actuated and moved by the suction cup moving mechanism 37 and are brought into contact with the surface of the stimulable phosphor sheet 21. The suction cups 34b, 34b thus hold the stimulable phosphor sheet 21 by suction. Also, the suction cup moving mechanism 37 moves the suction cups 34b, 34b in the horizontal direction, i.e. in the direction indicated by the arrow +X in FIG. 7A, and the stimulable phosphor sheet 21 is thereby taken out of the cassette 20. Thereafter, the suction cup moving mechanism 37 moves the suction cups 34b, 34b downwardly in the vertical direction, i.e. in the direction indicated by the arrow −Y in each of FIGS. 7A and 7B. The stimulable phosphor sheet 21 is thus delivered to the position of the roller pair 46.

The stimulable phosphor sheet 21, which has been delivered to the position of the roller pair 46 in the manner described above, is received by the roller pair 46 and is guided via the conveyance guide 48 to the conveyance means 36. Also, the stimulable phosphor sheet 21 is held by the roller pair 50 and is then conveyed downwardly through the roller pair 50, the roller pair 52, the roller pair 54, the roller pair 56, the conveyance guide 51, the conveyance guide 53, the conveyance guide 55, and the conveyance guide 57. After the stimulable phosphor sheet 21 has reached the lowest end A, the stimulable phosphor sheet 21 is conveyed through the conveyance path reversely, i.e. upwardly.

A position J corresponding to the conveyance guide 53 is the position at which the radiation image read-out section 38 reads out the radiation image from the stimulable phosphor sheet 21.

In the radiation image read-out section 38, the stimulating rays Le having been produced by the stimulating ray source 72 pass through the lens 74. The stimulating rays Le having passed through the lens 74 are reflected and deflected in the horizontal direction by the rotating polygon mirror 76, which is rotated by a motor (not shown). The stimulating rays Le are thus irradiated to each of the point-shaped sites on the stimulable phosphor sheet 21, which is being conveyed in the manner described above. The stimulating rays Le are scanned in the direction indicated by the arrow +X in FIG. 7A, while the stimulating rays Le are being irradiated onto the stimulable phosphor sheet 21. In this manner, the scanning of the stimulable phosphor sheet 21 with the stimulating rays Le is performed.

While the stimulable phosphor sheet 21 is being scanned with the stimulating rays Le in the manner described above, the stimulable phosphor sheet 21 is guided by the conveyance guide 53 and is conveyed by the roller pair 52 and the roller pair 54 at a predetermined speed and in the downward direction, i.e. in the direction indicated by the arrow −Y in FIG. 7B. The stimulable phosphor sheet 21 is thus scanned with the stimulating rays Le in the main scanning direction (i.e., in the direction indicated by the arrow X in FIG. 7B, which is the horizontal direction) and in the sub-scanning direction (i.e., in the direction indicated by the arrow Y in FIG. 7B, which is the vertical direction). With the scanning in the main scanning direction and in the sub-scanning direction, the entire area of the stimulable phosphor sheet 21 is exposed to the stimulating rays Le.

When each of the point-shaped sites on the stimulable phosphor sheet 21 is exposed to the stimulating rays Le, light Ke is emitted from each of the point-shaped sites on the stimulable phosphor sheet 21. The intensity of the emitted light Ke is proportional to the radiation image, which has been stored on the stimulable phosphor sheet 21 with the radiation image recording operation described above, i.e. proportional to the amount of radiation energy having been stored on the stimulable phosphor sheet 21. The emitted light Ke is guided by the light guide member 80 and is detected by the photodetector 82, which may be constituted of a photomultiplier, or the like. The emitted light Ke is thus photoelectrically converted into an image signal representing the radiation image of the object.

As described above, with the radiation image recording and read-out system, the scanning of the stimulable phosphor sheet 21 with the stimulating rays Le is performed from the object image-carrying edge area 21T, in which the radiation image pattern representing the object has been stored, the object image-carrying edge area 21T being one of the edge areas of the stimulable phosphor sheet 21. More specifically, as illustrated in FIG. 8, with the radiation image recording and read-out system described above, the scanning of the stimulable phosphor sheet 21 with the stimulating rays Le is performed from the object image-carrying edge area 21T, in which the radiation image pattern 2H representing the side of the chest wall 2 of the breast 1 has been stored, and which is one of the edge areas of the stimulable phosphor sheet 21, toward an opposite edge area 21R, which is opposite to the object image-carrying edge area 21T. In cases where the scanning of the stimulable phosphor sheet 21 with the stimulating rays Le is thus performed from the object image-carrying edge area 21T, the detection of the emitted light Ke is capable of being performed such that the problems do not occur in that the after-glow of the light, which has been caused by the stimulating rays Le to be emitted from a direct radiation-exposed region D1 carrying no radiation image of the breast 1 stored thereon, mixes into the emitted light Ke, which is emitted from an indirect radiation-exposed region D2 carrying the radiation image of the breast 1 stored thereon. Therefore, the lowering of the quality of the image signal, which is obtained from the detection of the emitted light Ke, is capable of being suppressed. Specifically, the lowering of the quality of the image signal, which is obtained from the detection of the emitted light Ke and which represents the radiation image of the breast 1 acting as the object, is capable of being suppressed.

The image signal having been acquired in the manner described above is sent into an image forming section (not shown) and is subjected to processing for the formation of an image representing the radiation image of the breast 1. Thereafter, the image signal having thus been processed is sent to a display device, such as a printer or a CRT display device. The radiation image of the breast 1 is thus reproduced from the image signal as a visible image by use of the display device.

After the stimulable phosphor sheet 21 has been subjected to the radiation image read-out operation with the irradiation of the stimulating rays Le and has been conveyed to the lowest end A, the stimulable phosphor sheet 21 is conveyed upwardly, i.e. in the direction indicated by the arrow +Y in FIG. 7B, through the roller pair 56, the roller pair 54, the roller pair 52, the roller pair 50, the conveyance guide 57, the conveyance guide 55, the conveyance guide 53, and the conveyance guide 51. Also, the stimulable phosphor sheet 21 is exposed to the erasing light produced by the erasing light source 95, which is located at the position corresponding to the conveyance guide 48. With the erasing light, the radiation energy remaining on the stimulable phosphor sheet 21 is erased. Thereafter, the stimulable phosphor sheet 21 is conveyed into the cassette loading section 32 with the actuation of the roller pair 46. Further, the stimulable phosphor sheet 21 is sucked and held by the suction cups 34*b*, 34*b* and is accommodated into the cassette 20 by the movement of the suction cups 34*b*, 34*b* performed by the suction cup moving mechanism 37.

When the stimulable phosphor sheet 21 has been accommodated in the cassette 20, the cover member opening and closing means 39 closes the cover member 23, and the cassette 20 thus becomes capable of being discharged from the cassette loading section 32. The cassette 20, in which the stimulable phosphor sheet 21 has been accommodated, is capable of being used again for the recording of a radiation image.

As the stimulable phosphor sheet 21, it is possible to utilize a stimulable phosphor sheet provided with a stimulable phosphor layer containing a compound, which may be represented by a chemical formula MeX:Eu, wherein Me represents at least one kind of element selected from the group consisting of Rb (rubidium) and Cs (cesium), and X represents at least one kind of element selected from the group consisting of Cl (chlorine), Br (bromine), and I (iodine). The stimulable phosphor layer containing the compound, which may be represented by the chemical formula MeX:Eu, has the after-glow attenuation characteristics worse than the after-glow attenuation characteristics of other kinds of stimulable phosphors. Specifically, the stimulable phosphor layer containing the compound, which may be represented by the chemical formula MeX:Eu, has the after-glow attenuation characteristics such that the rate of the attenuation of the intensity of the after-glow is lower than the rate of the attenuation of the intensity of the after-glow emanating from ordinary kinds of the stimulable phosphor sheets. Therefore, in cases where the radiation image signal acquiring method in accordance with the present invention is applied to the stimulable phosphor sheet provided with the stimulable phosphor layer containing the compound, which may be represented by the chemical formula MeX:Eu, it is possible to obtain marked effects of suppressing the lowering of the quality of the image signal, which represents the radiation image of the object.

The stimulable phosphor layer described above may be formed with a vapor phase deposition technique, wherein CsBr and $EuBr_2$ are subjected to dual-source vacuum evaporation with resistance heating and thus subjected to vapor phase deposition. For example, with the vapor phase deposition technique described above, it is possible to form a stimulable phosphor layer comprising pillar-shaped crystal structures having a thickness of 10 μm and a height of 500 μm.

Also, in the embodiment described above, the radiation image signal acquiring method in accordance with the present invention is applied to the radiation image signal acquiring apparatus 102 constituted as a point scanning type of the apparatus, wherein the scanning of the stimulable phosphor sheet 21 with the stimulating rays Le is performed with irradiation of the stimulating rays Le to each of the point-shaped sites on the stimulable phosphor sheet 21, and wherein the emitted light Ke having been emitted from each of the point-shaped sites on the stimulable phosphor sheet 21 during the scanning with the stimulating rays Le is detected. Alternatively, the radiation image signal acquiring method in accordance with the present invention may be applied to a radiation image signal acquiring apparatus constituted as a line beam scanning type of the apparatus, wherein the scanning of the stimulable phosphor sheet with the stimulating rays is performed with irradiation of the stimulating rays to each of linear regions on the stimulable phosphor sheet, and wherein the light emitted from each of the linear regions on the stimulable phosphor sheet during the scanning with the stimulating rays is detected by use of a line sensor.

What is claimed is:

1. A radiation image signal acquiring method, comprising the steps of:
   i) scanning a stimulable phosphor sheet, on which a radiation image of an object has been stored, with stimulating rays, which cause the stimulable phosphor sheet to emit light in proportion to the amount of energy stored on the stimulable phosphor sheet during exposure of the stimulable phosphor sheet to radiation, and
   ii) detecting the light, which is emitted by the stimulable phosphor sheet when the stimulable phosphor sheet is scanned with the stimulating rays, whereby an image signal representing the radiation image of the object is acquired,
   wherein the scanning of the stimulable phosphor sheet with the stimulating rays is performed from an object image-carrying edge area, in which a radiation image pattern representing the object has been stored, the object image-carrying edge area being one of edge areas of the stimulable phosphor sheet.

2. A radiation image signal acquiring method, comprising the steps of:
   i) scanning a stimulable phosphor sheet, on which a radiation image of a breast has been stored, with stimulating rays, which cause the stimulable phosphor sheet to emit light in proportion to the amount of energy stored on the stimulable phosphor sheet during exposure of the stimulable phosphor sheet to radiation, and
   ii) detecting the light, which is emitted by the stimulable phosphor sheet when the stimulable phosphor sheet is scanned with the stimulating rays, whereby an image signal representing the radiation image of the breast is acquired,
   wherein the scanning of the stimulable phosphor sheet with the stimulating rays is performed from an object image-carrying edge area, in which a radiation image pattern representing a chest wall side of the breast has been stored, the object image-carrying edge area being one of edge areas of the stimulable phosphor sheet.

3. A method as defined in claim 1 wherein the scanning of the stimulable phosphor sheet with the stimulating rays is performed with an operation for irradiating the stimulating rays to each of a plurality of point-shaped sites on the stimulable phosphor sheet.

4. A method as defined in claim 2 wherein the scanning of the stimulable phosphor sheet with the stimulating rays is performed with an operation for irradiating the stimulating rays to each of a plurality of point-shaped sites on the stimulable phosphor sheet.

5. A method as defined in claim 1 wherein the stimulable phosphor sheet is provided with a stimulable phosphor layer containing a compound, which may be represented by a chemical formula MeX:Eu,
   wherein Me represents at least one kind of element selected from the group consisting of Rb and Cs, and X represents at least one kind of element selected from the group consisting of Cl, Br, and I.

6. A method as defined in claim 2 wherein the stimulable phosphor sheet is provided with a stimulable phosphor layer containing a compound, which may be represented by a chemical formula MeX:Eu,
   wherein Me represents at least one kind of element selected from the group consisting of Rb and Cs, and X represents at least one kind of element selected from the group consisting of Cl, Br, and I.

7. A method as defined in claim 3 wherein the stimulable phosphor sheet is provided with a stimulable phosphor layer containing a compound, which may be represented by a chemical formula MeX:Eu,
   wherein Me represents at least one kind of element selected from the group consisting of Rb and Cs, and X represents at least one kind of element selected from the group consisting of Cl, Br, and I.

8. A method as defined in claim 4 wherein the stimulable phosphor sheet is provided with a stimulable phosphor layer containing a compound, which may be represented by a chemical formula MeX:Eu, wherein Me represents at least one kind of element selected from the group consisting of Rb and Cs, and X represents at least one kind of element selected from the group consisting of Cl, Br, and I.

9. A method as defined in claim 5 wherein the stimulable phosphor layer is a layer having been formed with a vapor phase deposition technique and comprises optically anisotropic pillar-shaped crystal structures, which extend in a direction normal to a surface of the stimulable phosphor layer.

10. A method as defined in claim 6 wherein the stimulable phosphor layer is a layer having been formed with a vapor phase deposition technique and comprises optically anisotropic pillar-shaped crystal structures, which extend in a direction normal to a surface of the stimulable phosphor layer.

11. A method as defined in claim 7 wherein the stimulable phosphor layer is a layer having been formed with a vapor phase deposition technique and comprises optically anisotropic pillar-shaped crystal structures, which extend in a direction normal to a surface of the stimulable phosphor layer.

12. A method as defined in claim 8 wherein the stimulable phosphor layer is a layer having been formed with a vapor phase deposition technique and comprises optically anisotropic pillar-shaped crystal structures, which extend in a direction normal to a surface of the stimulable phosphor layer.

13. A method as defined in claim 1 wherein the scanning is performed in a horizontal direction and in a vertical direction.

14. A method as defined in claim 2 wherein the scanning is performed in a horizontal direction and in a vertical direction.

15. A method as defined in claim 1 wherein each of the plurality of point-shaped sites comprises a point where the stimulable phosphor sheet is scanned with a stimulating ray of the stimulating rays.

16. A method as defined in claim 2 wherein each of the plurality of point-shaped sites comprises a point where the stimulable phosphor sheet is scanned with a stimulating ray of the stimulating rays.

17. A method as defined in claim 1 further comprising determining the object image-carrying edge area to determine an edge for scanning prior to scanning.

18. A method as defined in claim 1, where the object image-carrying edge area comprises an edge of the phosphor sheet on a side where the object image is formed.

19. A method as defined in claim 1, wherein scanning is carried out in consistently one direction in each of a main scan and a sub-scan direction.

\* \* \* \* \*